United States Patent Office 3,387,031
Patented June 4, 1968

3,387,031
SYNTHESIS OF ALPHA-AMINO ACID AMIDE HYDROHALIDES
Herbert E. Johnson, South Charleston, W. Va., and Donald G. Crosby, Davis, Calif., assignors to Union Carbide Corporation, a corporation of New York
No Drawing. Original application June 8, 1961, Ser. No. 115,609, now Patent No. 3,190,917, dated June 22, 1965. Divided and this application Jan. 20, 1964, Ser. No. 338,631
5 Claims. (Cl. 260—561)

ABSTRACT OF THE DISCLOSURE

An alpha-amino nitrile is reacted with a hydrogen halide and an alcohol to produce the corresponding alpha-amino acid amide hydrogen halide. The course of the reaction is critically dependent upon the alcohol, with a primary alcohol being required when the alpha-amino nitrile is disubstituted at the 2-position carbon atom or branched at the 3-position carbon atom and a secondary alcohol being required when the alpha-amino nitrile is aminoacetonitrile, a straight-chain-alpha-amino nitrile, or an alpha-amino nitrile which is branched only beyond the 3-position carbon atom.

---

This application is a division of copending application Ser. No. 115,609 filed on June 8, 1961 and issued on June 22, 1965 as United States Patent 3,190,917.

This invention relates to a novel method of synthesizing alpha-amino acid amides in the form of corresponding hydrogen halide salts and a by-product alkyl halide. The term alpha-amino acid amides is, for the purpose of this invention, intended to include those alpha-amino acid amides in which the hydrogens of the amino group are unsubstituted, monosubstituted or disubstituted by alkyl, aryl, aralkyl, or alkaryl groups.

It is an object of the present invention to provide a method for the synthesis and recovery of alpha-amino acid amides in the form of corresponding hydrogen halide salts by reacting an alpha-amino nitrile or an inroganic acid amides in the form of corresponding hydrogen halide having a molecular weight greater than 35, in a solvent of either a primary or a secondary alcohol, chosen primarily in respect to the characteristics of the alpha-amino nitrile used. When the alcohol used in the reactions herein disclosed serves as both solvent reaction medium and as a reactant, for the purposes of the present invention the alcohol shall be referred to as "alcohol solvent."

It is a further object of the invention to provide a method of synthesizing alpha-amino acid amide hydrohalides in which a by-product alkyl halide, corresponding to the primary or secondary alcohol used, is formed and later recovered.

The aforementioned objects may be accomplished by reacting an alpha-amino nitrile or a alpha-amino nitrile inorganic acid salt corresponding to the alpha-amino acid amide salt desired with a hydrogen halide having a molecular weight greater than 35 in a solvent of either a primary or a secondary alcohol selected primarily in respect to the alpha-amino nitrile used. The reaction may be illustrated by the following reaction diagram:

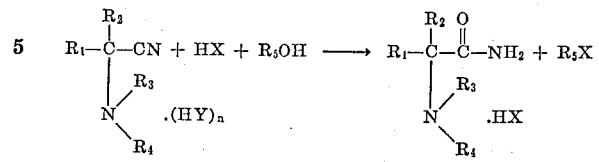

wherein $R_1$ is hydrogen, alkyl, hydroxyalkyl, mercaptoalkyl, alkoxyalkyl, alkylthioalkyl, aryl, arylalkyl, haloaryl, haloarylalkyl, hydroxyaryl, hydroxyarylalkyl, mercaptoaryl, mercaptoarylalkyl, arylthio, arylalkylthio, alkylthio, alkoxy, or heterocyclic and may be substituted or unsubstituted; $R_2$, $R_3$ and $R_4$ are hydrogen, alkyl groups containing from one to twenty carbon atoms, alkenyl groups containing from two to twenty carbon atoms, alkynyl groups containing from two to twenty carbon atoms, alkadienyl groups containing from three to twenty carbon atoms, alkapolyenyl groups containing from five to twenty carbon atoms, aryl groups, aralkyl groups containing from seven to twenty carbon atoms or alkaryl groups containing from seven to twenty carbon atoms, may be substituted or unsubstituted, and may be the same or different; $R_5$ is alkyl containing from one to seven carbon atoms inclusive, alkenyl containing from two to seven carbon atoms inclusive, or cycloalkyl containing from three to seven carbon atoms inclusive; HX is a hydrogen halide having a molecular weight greater than 35; HY is an inorganic acid and may be the same as HX or different; and $n$ is either 0 to 1.

Illustrative of the radicals represented by $R_1$ are: hydrogen, methyl, ethyl, n-propyl, isopropyl, n-butyl, isobutyl, 2-butyl, hydroxymethyl, 1-hydroxymethyl, 1-hydroxyethyl, 2-hydroxyethyl, mercaptomethyl, mercaptoethyl, methylthioethyl, ethylthioethyl, ethylthiomethyl, methylthiomethyl, methoxy methyl, ethoxymethyl, methoxyethyl, ethoxyethyl, chlorophenyl, dichlorophenyl, hydroxyphenyl, benzyl, ar-hydroxybenzyl, ar-mercaptophenyl, phenylthio, benzylthio, phenyl, morpholino, imidazolylmethyl and indolylmethyl and the like; illustrative of the radicals represented by $R_2$, $R_3$ and $R_4$ are: hydrogen, methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trimethylene, tetramethylene, ethenyl, propenyl, butenyl, pentenyl, hexenyl, decenyl, tetradecenyl, hexadecenyl, nonadecenyl, eicosenyl, ethynyl, propynyl, butynyl, octynyl, dodecynyl, pentadecynyl, octadecynyl, eicosynyl, butadienyl, pentadienyl, hexadienyl, decadienyl, tetradecadienyl, heptadecadienyl, eicosadienyl, octatrienyl, pentadecatrienyl, nonadecatrienyl, dodecatrienyl, eicosatrienyl, phenyl, naphthyl, benzylphenyl, diphenyl, anthracenyl, phenanthrenyl, benzyl, phenethyl, phenylpropyl, diphenylmethyl, triphenylmethyl, phenyldecyl, diphenyloctyl, tolyl, mesityl, undecylphenyl, and the like; illustrative of the radicals represented by $R_5$ are: methyl, ethyl, n-propyl, 2-propyl, n-butyl, isobutyl, n-pentyl, n-hexyl, n-heptyl, benzyl, allyl, crotyl, pentenyl, hexenyl, 2-propyl, 2-butyl, 2-pentyl, 3-pentyl, 2-hexyl, 3-hexyl, 2-heptyl, cyclopentyl, cyclohexyl and the like.

Illustrative of the inorganic acids which are represented by HY are: hydriodic acid, hydrobromic acid, hydrochloric acid, hydrofluoric acid, phosphoric acid, sulfuric acid, tungstic acid, titanic acid, chromic acid, bromic acid, chloric acid, iodic acid, nitric acid, periodic acid, perbromic acid, perchloric acid and the like.

$R_1$, $R_2$, $R_3$ and $R_4$ may be unsubstituted or substituted with groups such as fluoro, chloro, bromo, iodo, hydroxy, mercapto, amino, nitro and cyano. When the $R_1$ or $R_2$ of the alpha-amino nitrile is substituted with a cyano group, both the cyano group of the nitrile and the substituted cyano-group are converted to amides resulting in a corresponding diamide.

When the nitrogen of the amine group is incorporated into a heterocyclic ring, the alpha amino acid amide may have either of the following structural formulas:

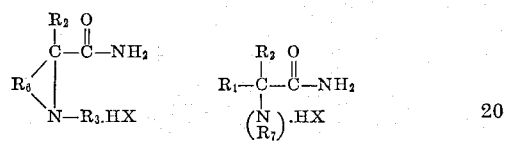

wherein $R_6$ is methylene, ethylene, trimethylene, or tetramethylene and may be substituted or unsubstituted; and $R_7$ may be ethylene, trimethylene, tetramethylene, pentamethylene, ethyleneoxyethylene, ethylenethioethylene, ethyleneaminoethylene, methyleneaminopropylene and methyleneaminomethyleneaminomethylene, and may be subsituted or unsubstituted; and $R_1$, $R_2$ and $R_3$ and HX have been previously defined.

The alcohol solvent represented in the above diagram by $R_5OH$ is selected primarily in respect to the alpha-amino nitrile selected. It has been found that the above reaction will operate only in the presence of a primary or secondary alcohol, and whether a primary or secondary alcohol is used in the reaction is dependent upon the alpha-amino nitrile used. Specifically, when the alpha-amino nitrile used is branched at the 3-position carbon atom or is disubstituted at the 2-carbon position, then a primary alcohol of from one to seven carbon atoms in length is used. When the alpha-amino nitrile used is amino-acetonitrile, a straight-chain alpha-amino nitrile, or an alpha-amino nitrile which is branched only beyond the 3-position carbon atom, then a secondary alcohol of from three to seven carbon atoms in length is used. When the alpha-amino nitrile used is alpha-amino-beta-phenylpropionitrile, then the solvent may be either a primary or secondary alcohol of the above types. If a primary alcohol is used with an amino nitrile which requires a secondary alcohol or vice versa, the reaction will produce only nonmeasurable amounts of the desired amino acid amide and by-product alkyl halide if any at all.

More specifically the obects of the present invention may be accomplished by dissolving an alpha-aminonitrile in a primary or secondary alcohol selected in accordance with the aforementioned criteria. This solution is then saturated with a hydrogen halide, having a molecular weight greater than 35, at a temperature of from about —10° C. to the reflux temperature of the solvent used. The reaction mixture is then allowed to stand for a period of from 0 hours to 24 hours at a temperature of from about 0° C. to about 40° C. After the reaction mixture has been allowed to stand for the requisite period of time, it may be refluxed for a period of from 0 to 12 hours to insure completion of the reaction, although this is not necessary to initiate the reaction as is shown in Example 24. The reaction mixture is then cooled. The alpha-amino acid amide hydrohalide is separated by filtration and the alkyl halide by-product is recovered from the filtrate by distillation or condensation during the reflux period. The alpha-amino acid amide can be recovered from its hydrogen halide salt by subsequent treatment with a base such as dilute sodium hydroxide solution.

While commercial grade reactants may be used in the foregoing reaction, it is preferable that the reaction mixture should contain no more than 4 parts by weight of water.

The alcohol solvent used in this process is critical in that the process is operable only when a primary or secondary alcohol is used within the limits disclosed.

The following table is illustrative of the type of alcohol, i.e., primary or secondary, which is best used with various alpha-amino nitriles. It is not intended, in any way, to limit or restrict this invention.

| Nitrile: | Alcohol |
|---|---|
| α-Aminoisovaleronitrile | Primary. |
| Aminoacetonitrile | Secondary. |
| α-Aminopropionitrile | Do. |
| α-Aminoisocapronitrile | Do. |
| α-Amino-α-methylpropionitrile | Primary. |
| α-Aminobutyronitrile | Secondary. |
| α-Amino-β-methylvaleronitrile | Primary. |
| α-Amino-α-phenylacetonitrile | Do. |
| α-(p-Chlorophenyl)-α-aminoacetonitrile | Do. |
| α-Amino-β-hydroxypropionitrile | Secondary. |
| α-Amino-β-ethoxypropionitrile | Do. |
| α-Amino-α-methylthiobutyronitrile | Do. |
| N-methylaminoacetonitrile | Do. |
| N-cyanomethylmorpholine | Do. |
| α-Amino-β-phenylpropionitrile | Primary or secondary. |

Selection within the groups of primary or secondary alcohols may be influenced by the desired by-product halide which results.

Illustrative of the pirmary alcohols which may be used are methanol, ethanol, n-propanol, n-butanol, isobutanol, n-pentanol, n-hexanol, allyl alcohol, benzyl alcohol, crotyl alcohol, hexanol, and the like. Illustrative of the secondary alcohols which may be used are 2-propanol, 2-butanol, 2-pentanol, 3-pentanol, 2-hexanol, 3-hexanol, cyclopentanol, cyclohexanol, and the like.

The amount of alcohol solvent used is not critical, but greater than two molar concentrations of nitrile results in a slurry too thick to stir and quantities greater than two liters of alcohol per mol of nitrile result in solubility losses and cause excessive amounts of hydrogen halide to be used.

The choice of hydrogen halide may also be influenced by the alkyl halide by-product desired. Illustrative of the hydrogen halide which may be used in this reaction are hydrogen chloride, hydrogen bromide and hydrogen iodide. The hydrogen halide dissolved should amount to at least 20 percent by weight based upon the weight of the nitrile used or the saturation point of the alcohol whichever is less.

The reaction may be carried out at atmospheric or super-atmospheric pressures. If the reaction is run at super-atmospheric pressure, the reaction may be heated to temperatures of at least 150° C., to insure completion of the reaction. Naturally under such conditions appropriate pressure equipment should be used.

The process of the present invention will effect the production of any alpha-amino acid amide from the corresponding nitrile, in high yield and good efficiency provided the proper alcohol solvent is utilized.

Example 1.—Valinamide hydrochloride

A solution of 50 grams (0.51 mol) of α-aminoisovaleronitrile in 500 milliliters of absolute ethanol was saturated with moderately dry hydrogen chloride while holding the temperature to 20° C. to 25° C. The mixture was stirred at a temperature of 20° C.–25° C. for a period of 16 hours and then refluxed for 1 hour. After cooling the mixture the product was collected by filtration and dried to give 58 grams (76 percent) product.

Physical state—Colorless solids

Melting point range—235°–260° C. with decomposition

From this reaction product an analytical sample was prepared by several crystallizations from ethanol.

Physical state—Colorless plates
Melting point range—246°–249° C. with decomposition
Carbon content, percent by weight:
  Found: 39.25
  Calculated: 39.52
Hydrogen content, percent by weight:
  Found: 8.40
  Calculated: 8.56
Chlorine content, percent by weight:
  Found: 23.10
  Calculated: 23.16
Nitrogen content, percent by weight:
  Found: 17.85
  Calculated: 18.30

Example 2.—Valinamide hydrochloride

Two mols of crude $\alpha$-aminoisovaleronitrile (prepared from isobutyraldehyde cyanohydrin and ammonia) containing from 1 to 2 mols of water, from the preparation reaction, was added to 1.2 liters of absolute ethanol and the mixture saturated with moderately dry hydrogen chloride at a temperature of from 25° C. to 35° C. After standing overnight, the mixture was slowly heated to reflux and held at that temperature for 3 hours. The mixture was then cooled and the product collected by filtration to give a 216 gram (72 percent) yield.

Physical state—Colorless crystalline solids
Melting point range—233° C.–239° C. with decomposition

Example 3.—Valinamide hydrochloride

The reaction was carried out as described in Example 1 except that the reaction was not allowed to stand overnight and the off-gases were collected in a cold trap. Distillation of this material gave nearly a 100 percent yield of ethyl chloride, identified by its infra-red spectrum and boiling point.

Boiling point at an absolute pressure—14°–16° C. of 760 mm. of mercury

Example 4.—Valinamide hydrochloride

A slurry of 157 grams (1.15 mols) of $\alpha$-aminoisovaleronitrile hydrochloride in 600 milliliters of absolute ethanol was saturated with hydrogen chloride gas while holding the temperature of the reaction constant at a temperature of about 25° C. The mixture was stirred at a temperature of from 35° C.–40° C. for a period of 1.5 hours and then refluxed for a period of 1.5 hours. After cooling the mixture, the product was collected by filtration to give a 139 gram (78 percent) yield.

Physical state—Colorless crystalline solid
Melting point range—233°–238° C. with decomposition

Example 5.—Valinamide hydrochloride

The reaction was carried out as described in Example 1 except that 2 liters of ethanol per mol of $\alpha$-aminoisovaleronitrile were used and the reaction mixture was not allowed to stand for 16 hours. A 76 percent yield was obtained.

Physical state—Colorless crystalline solid
Melting point range—232°–238° C. with decomposition

Example 6.—Valinamide hydrochloride

The reaction was carried out as described in Example 1 except that the mixture was not cooled during the addition of hydrogen chloride. A slow stream of hydrogen chloride was continued after the reflux temperature was reached and the mixture was refluxed for 3 hours. A 22 percent yield was obtained.

Physical state—Colorless crystalline solid
Melting point range—232°–240° C. with decomposition

Example 7.—Valinamide hydrochloride

The reaction was carried out as described in Example 1 except that 4 mols of water were added per mol of $\alpha$-aminoisovaleronitrile. Only 18 percent yield was obtained.

Physical state—Colorless crystalline solid
Melting point range—234°–241° C. with decomposition

Example 8.—Valinamide hydrochloride

The reaction was carried out as described in Example 1 except that methanol was used instead of ethanol and the mixture was not allowed to stand for 16 hours before heating to reflux. A 54 percent yield was obtained.

Physical state—Colorless crystalline solid
Melting point range—232°–237° C. with decomposition

Example 9.—Glycinamide hydrochloride

To a solution of 3 mols of crude aminoacetonitrile (prepared from 3 mols of 70 percent aqueous glyconitrile and ammonia) 1.2 liters of isopropanol was saturated with moderately dry hydrogen chloride. The mixture was warmed to 60° C. and held at that temperature until the reaction subsided and then refluxed for an additional 1 hour period. The product was collected by filtration to give a 237 gram (82 percent) yield.

Physical state—Light-tan solid
Melting point range—180°–187° C. with decomposition

Example 10.—Alaninamide hydrochloride

One mol of crude $\alpha$-aminopropionitrile (prepared from acetaldehyde cyanohydrin and ammonia) was dissolved in 500 milliliters of isopropanol and the mixture was saturated with hydrogen chloride at 25° C. Upon heating the mixture, a gummy material formed that readily solidified. The mixture was refluxed for 2 hours, cooled, and the product isolated by filtration to give a 92 gram (74 percent) yield.

Physical state—Off-white solid
Melting point range—159°–166° C. with decomposition Several crystallizations from ethanol afforded an analytical sample.

Melting point range—169°–172° C.
Carbon content, percent by weight:
  Found 29.32
  Calculated 28.92
Hydrogen content, percent by weight:
  Found 7.14
  Calculated 7.28
Nitrogen content, percent by weight:
  Found 22.45
  Calculated 22.49

Example 11.—Alaninamide hydrochloride

The reaction was carried out as described in Example 10 except that 2-butanol was used as the solvent. A 78 percent yield was obtained.

Physical state—Off-white solid
Melting point range—160°–166° C. with decomposition

Example 12.—Leucinamide hydrochloride

Two mols of crude alpha-aminoisocapronitrile (from 3-methylbutylbutyraldehyde cyanohydrin and ammonia) was dissolved in 1 liter of isopropanol and the mixture was then saturated with hydrogen chloride at 25° C. The mixture was allowed to stand for a period of 2 hours at 25°–30° C. and then heated at reflux for a total of 4 hours. The product was collected by filtration to give a 165 gram (50 percent) yield.

Physical state—Colorless crystalline solid
Melting point range—214°–218° C. with decomposition Analytical sample was prepared by several crystallizations from ethanol.

Physical state—Colorless glistening plates
Melting point range—224°–229° C. with decomposition
Carbon content, percent by weight:
  Found 43.51
  Calculated 43.24
Hydrogen content, percent by weight:
  Found 8.98
  Calculated 9.07
Chlorine content, percent by weight:
  Found 21.12
  Calculated 21.27
Nitrogen content, percent by weight:
  Found 16.80
  Calculated 16.81

Example 13.—Phenylalaninamide hydrochloride

A solution of 1 mol of crude benzylaminoacetonitrile (prepared from phenylacetaldehyde cyanohydrin and ammonia) in 700 mililiters of ethanol was saturated with moderately dry hydrogen chloride at a temperature of about 25° C. The mixture was then heated to reflux temperature and held for a period of 2 hours. After cooling the mixture, the product was isolated by filtration and dried to give a 106 gram (53 percent) yield.

Physical state—Off-white crystalline powder
Melting point range—237°–240° C. with decomposition An analytical sample prepared by several crystallizations from ethanol.

Physical state—Colorless blunt needles
Melting point range—238°–241° C. with decomposition
Carbon content, percent by weight:
  Found 53.71
  Calculated 53.87
Hydrogen content, percent by weight:
  Found 6.36
  Calculated 6.53
Nitrogen content, percent by weight:
  Found 13.94
  Calculated 13.96

Example 14.—Phenylalaniniamide hydrochloride

The reaction was carried out as described in Example 13 except that 700 mililiters of isopropanol was used as solvent. A 45 percent yield was obtained.

Physical state—Off-white crystalline solid
Melting point range—236°–239° C. with decomposition

Example 15.—Valinamide hydrochloride

The reaction was carried out as described in Example 1 using 49 grams of alpha-aminoisovaleronitrile and 400 mililiters of ethanol except that the reaction was heated rapidly to 100° C. in a stainless steel autoclave. After rapidly cooling the mixture to 30° C., a 48 gram (63 percent) yield was obtained.

Example 16.—Valinamide hydrochloride

The reaction was carried out as described in Example 1 using 49 grams of alpha-aminoisovaleronitrile and 300 mililiters of allyl alcohol. The reaction mixture was held at a temperature of 20°–34° C. overnight thereafter giving a 66 gram (86 percent) yield.

Melting point range—238°–240° C. with decomposition

Example 17.—Valinamide hydrochloride

The reaction was carried out as described in Example 16 except that 300 mililiters of n-propanol was used as a solvent and the mixture was heated to 92° C. over a period of 3 hours. After cooling the mixture an 82 percent yield of product was isolated.

Melting point range—238°–241° C. with decomposition

Example 18.—Valinamide hydrochloride

The reaction was carried out as described in Example 16 except that 300 mililiters of n-butanol was used as a solvent and the mixture was heated to 80° C. over a period of 1.5 hours after having been held at a temperature of 25° C. overnight. An 88 percent yield of product was obtained.

Melting point range—243°–245° C. with decomposition

Example 19.—Valinamide hydrobromide

The reaction was carried out as described in Example 1 except that the ethanol solution was saturated with anhydrous hydrogen bromide. A 77 percent yield was obtained.

Melting point range—235°–238° C. with decomposition.

An analytical sample was obtained by crystallization from ethanol.

Melting point range—235°–238° C. with decomposition.
Carbon content, percent by weight:
  Found 30.51
  Calculated 30.47
Hydrogen content, percent by weight:
  Found 6.45
  Calculated 6.65
Nitrogen content, percent by weight:
  Found 14.28
  Calculated 14.22

Example 20.—Glycinamide hydrochloride

The reaction was carried out as described in Example 9 except that 2-butanol was used as the solvent. A 97 percent yield of product was obtained.

Example 21.—Alpha-methylalaninamide hydrochloride

A solution of 125 grams (1.5 mols) of crude alpha-amino-alpha-methylpropionitile in 2 liters of ethanol was saturated with moderately dry hydrogen chloride at from 20°–25° C. The mixture was allowed to stand overnight at 25° C. and then heated to 65° C. over a 3 hour period. The precipitated solids were isolated by filtration to give 141 grams (82 percent) yield of product.

Melting point range—253°–256° C. with decomposition

Crystallization from ethanol afforded an analytical sample.

Melting point—268° C. with decomposition
Carbon content, percent by weight:
  Found 34.62
  Calculated 34.66
Hydrogen content, percent by weight:
  Found 7.92
  Calculated 8.00
Nitrogen content, percent by weight:
  Found 20.31
  Calculated 20.22

Example 22.—Alpha-aminobutyramide hydrochloride

A solution of 4.45 mols of crude alpha-aminobutyronitrile in 3 liters of isopropanol was saturated with moderately dry hydrogen chloride at a temperature of 20°–25° C. The mixture was allowed to stand at a temperature of from 25°–35° C. overnight and then heated briefly to boiling. The precipitated solids were collected to give a 436 gram (77 percent) yield.

Melting point range—211°–217° C. with decomposition

An analytical sample was prepared by crystallization from acetic acid.

Melting point range—218°–222° C. with decomposition
Carbon content, percent by weight:
  Found 34.85

Calculated 34.66
Hydrogen content, percent by weight:
Found 8.01
Calculated 8.00
Nitrogen content, percent by weight:
Found 19.89
Calculated 20.21

Example 23.—Norvalinamide hydrochloride

A solution of 2.0 mols of crude alpha-aminovaleronitrile in 1.5 liters of isopropanol was saturated with moderately dry hydrogen chloride at a temperature of from 20°–25° C. The mixture was allowed to stand overnight and then heated quickly to boiling. The precipitated solids were collected to give a 233 gram (76 percent) yield.

Melting point range—240°–243° C. with decomposition

An analytical sample was prepared by crystallization from ethanol.

Melting point—250° C. with decomposiiton
Carbon content, percent by weight:
Found 39.21
Calculated 39.52
Hydrogen content, percent by weight:
Found 8.58
Calculated 8.56
Nitrogen content, percent by weight:
Found 18.01
Calculated 18.30

Example 24.—Isoleucinamide hydrochloride

A solution of 0.5 mol of alpha-amino-beta-methylvaleronitrile in 300 milliliters of allyl alcohol was saturated with moderately dry hydrogen chloride at a temperature of from 20°–25° C. The mixture was stirred overnight at a temperature of from 20°–25° C. and a 59 gram (72 percent) yield was obtained.

Melting point range—214°–219° C. with decomposition

An analytical sample was prepared by crystallization from acetic acid.

Melting point range—232°–234° C. with decomposition
Carbon content, percent by weight:
Found 43.13
Calculated 43.24
Hydrogen content, percent by weight:
Found 8.94
Calculated 9.07
Nitrogen content, percent by weight:
Found: 16.37
Calculated 16.81

Example 25.—Phenylglycinamide hydrochloride

A solution of 2 mols of crude phenylaminoacetonitrile in 2 liters of ethanol was saturated with moderately dry hydrogen chloride at a temperature of from 20°–25° C. The mixture was allowed to stand overnight at a temperature of 25° C. and then heated to a temperature of 65° C. The precipitate was collected to give a 187 gram (50 percent) yield.

Melting point range—274°–276° C. with decomposition

An analytical sample was prepared by crystallization from ethanol.

Melting point range—270°–273° C. with decomposition
Carbon content, percent by weight:
Found 51.42
Calculated 51.48
Hydrogen content, percent by weight:
Found 5.95
Calculated 5.94
Nitrogen content, percent by weight:
Found 14.72
Calculated 15.01

Example 26.—p-Chlorophenylglycinamide hydrochloride

The reaction was carried out as described in Example 25 using 2 mols of crude p-chlorophenylaminoacetonitrile. A 57 percent yield of product was obtained.

Melting point range—254–283° C.

An analytical sample was prepared by crystallization from ethanol.

Melting point range—250°–267° C.
Carbon content, percent by weight:
Found 43.73
Calculated 43.46
Hydrogen content, percent by weight:
Found 4.32
Calculated 4.56
Nitrogen content, percent by weight:
Found 12.34
Calculated 12.67

Example 27.—Serinamide hydrochloride

A solution of 0.168 mol of crude alpha-amino-beta-hydroxypropionitrile in 100 milliliters of isopropanol was saturated with moderately dry hydrogen chloride at 20°–25° C. The reaction mixture was stirred overnight at 25° C. and then heated under reflux for 1.5 hours. The precipitated solids were collected by filtration to give an 18 gram (77 percent) yield.

Melting point range—175°–185° C. with decomposition

An analytical sample was prepared by crystallization from ethanol.

Melting point range—196°–199° C. with decomposition
Carbon content, percent by weight:
Found 25.77
Calculated 25.63
Hydrogen content, percent by weight.
Found 6.43
Calculated 6.45
Nitrogen content, percent by weight:
Found 19.65
Calculated 19.93

Example 28.—O-Ethylserinamide hydrochloride

A solution of 0.68 mol of crude alpha-amino-beta-ethoxypropionitrile in 500 milliliters of isopropanol was treated as described in Example 27. A 58 gram (51 percent) yield was obtained.

Melting point range—165°–166° C. with decomposition

An analytical sample was obtained by crystallization from isopropanol.

Melting point range—165°–166° C. with decomposition
Carbon content, percent by weight:
Found 35.82
Calculated 35.61
Hydrogen content, percent by weight:
Found 7.80
Calculated 7.77
Nitrogen content, percent by weight:
Found 16.29
Calculated 16.62

Example 29.—Methioninamide hydrochloride

A solution of 0.73 mol of crude alpha-amino-gamma-methylthiobutyronitrile in 700 milliliters of isopropanol was saturated with moderately dry hydrogen chloride at a temperature of from 20°–25° C. The mixture was then allowed to stand overnight at 25° C. and then heated briefly to boiling. The precipitated solids were collected to give a 95 gram (70 percent) yield.

Melting point range—176°–180° C. with decomposition

An analytical sample was prepared by crystallization from isopropanol.

Melting point range—189°–190° C.
Carbon content, percent by weight:
   Found 32.56
   Calculated 32.51
Hydrogen content, percent by weight:
   Found 7.17
   Calculated 7.09
Nitrogen content, percent by weight:
   Found 14.61
   Calculated 15.17
Chlorine content, percent by weight:
   Found 19.24
   Calculated 19.20

Example 30.—Methioninamide hydrochloride

The procedure of Example 29 was followed except that 700 milliliters of 2-butanol was used as a solvent. A 76 percent yield of the desired product was obtained.

Example 31.—Sarcosinamide hydrochloride

A solution of 1.42 mols of distilled N-methylaminoacetonitrile in 1 liter of isopropanol was saturated with moderately dry hydrogen chloride at a temperature of from 20°–30° C. After standing overnight the mixture was heated briefly to boiling. The precipitated solids were collected to give a 163 gram (91 percent) yield.

Melting point range—145°–150° C. with decomposition

An analytical sample was obtained by crystallization from ethanol.

Melting point range—160°–162° C. with decomposition.
Carbon content, percent by weight:
   Found 29.03
   Calculated 28.91
Hydrogen content, percent by weight:
   Found 7.32
   Calculated 7.28
Nitrogen content, percent by weight:
   Found 22.50
   Calculated 22.48

Example 32.—N-(carboxamidomethyl)morpholine hydrochloride

A solution of 86 grams (0.68 mol) of N-cyanomethylmorpholine in 750 milliliters of isopropanol was saturated with moderately dry hydrogen chloride at a temperature of from 20° C.–25° C. overnight and then heated to a temperature of 70° C. over a period of 1.5 hours. After cooling the mixture, the solids were collected and dried to give a 110 gram (90 percent yield).

Physical state—Colorless solid
Melting point range—174°–184° C.

An analytical sample was prepared by several crystallizations from ethanol.

Melting point range—192°–195° C.
Carbon content, percent by weight:
   Found 39.91
   Calculated 39.89
Hydrogen content, percent by weight:
   Found 7.44
   Calculated 7.25
Nitrogen content, percent by weight:
   Found 15.29
   Calculated 15.51

Example 33.—1-methyl-2,6-dicarboxamidopiperidine hydrochloride

A solution of 75 grams (0.5 mol) of 1-methyl-2,6-dicyanopiperidine in 500 milliliters of ethanol was prepared and saturated with hydrogen chloride gas at room temperature. The mixture was allowed to stand for about two days at room temperature and was then refluxed for about 1.5 hours. After cooling the mixture, the solids present were collected to give 55 grams (50 percent) product. A sample was recrystallized several times for analysis.

Physical state—Colorless crystalline plates
Melting point range—281° C. with decomposition.
Carbon content, percent by weight:
   Found 43.59
   Calculated 43.34
Hydrogen content, percent by weight:
   Found 7.02
   Calculated 7.28
Nitrogen content, percent by weight:
   Found 18.29
   Calculated 18.95

Example 34.—Alpha-methyl-alpha-phenylglycinamide hydrochloride

A solution of 3 mols of crude alpha-amino-alpha-methyl phenylacetonitrile in 3 liters of ethanol was saturated with hydrogen chloride gas at a temperature of less than 30° C. After allowing the mixture to stir overnight at room temperature, it was refluxed for about 2 hours. The mixture was cooled and the precipitated solids collected to give 142 grams of crystalline product. An analytical sample was prepared by several recrystallizations from acetic acid.

Physical state—Colorless crystals
Melting point range—266°–267° C.
Carbon content, percent by weight:
   Found 53.74
   Calculated 53.87
Hydrogen content, percent by weight:
   Found 7.04
   Calculated 6.53
Nitrogen content, percent by weight:
   Found 13.84
   Calculated 13.96

What is claimed is:

1. A method of synthesizing an alpha-amino acid amide hydrogen halide which comprises reacting an alpha-amino nitrile selected from the group consisting of alpha-amino-alpha - methylpropionitrile, alpha - amino-alpha-phenylacetonitrile, alpha - amino-alpha-(p-chlorophenyl)acetonitrile, alpha - aminoisovaleronitrile, alpha-amino-beta-methylvaleronitrile, alpha-amino-beta-phenylpropionitrile, and the inorganic acid salts thereof, with a hydrogen halide having a molecular weight greater than 35 and a primary alcohol of from 1 to 7 carbon atoms, which serves as solvent reaction medium, at a temperature of from about −10° C. to the reflux temperature of said primary alcohol and recovering the alpha-amino acid amide hydrogen halide produced thereby.

2. The method of claim 1 wherein said alpha-amino nitrile is dissolved in said primary alcohol and the resulting solution is then saturated with said hydrogen halide at a temperature of from about −10° C. to the reflux temperature of said primary alcohol, allowed to stand for a period of up to 24 hours at a temperature of from about 0° C. to about 40° C., and refluxed for a period of up to 12 hours.

3. The method of claim 1 wherein the alpha-amino nitrile is alpha-aminoisovaleronitrile.

4. The method of claim 1 wherein the alpha-amino nitrile is alpha-amino-alpha-methylpropionitrile.

5. The method of claim 1 wherein the primary alcohol is ethanol.

References Cited

UNITED STATES PATENTS

| | | | |
|---|---|---|---|
| 2,745,745 | 5/1956 | Blake et al. | 260—561 |
| 3,166,588 | 1/1965 | Johnson | 260—561 |
| 3,172,875 | 3/1965 | Paolo | 260—561 |
| 2,783,274 | 2/1957 | White et al. | 260—561 |

(Other references on following page)

FOREIGN PATENTS 394,084 6/1933 Great Britain.
767,679 2/1957 Great Britain.

OTHER REFERENCES

Migrdichian, Organic Synthesis, vol. I, p. 429, New York, Reinhold, 1957.

Vlannes et al.: Chem. Abst. vol. 54, columns 2042–3 (1960).

JOHN D. RANDOLPH, *Primary Examiner.*

WALTER A. MODANCE, N. S. MILESTONE, *Examiners.*

N. TROUSOF, *Assistant Examiner.*